A. G. F. FARGUES.
WELDING MACHINE.
APPLICATION FILED MAY 9, 1918.
1,329,890.
Patented Feb. 3, 1920.
3 SHEETS—SHEET 3.
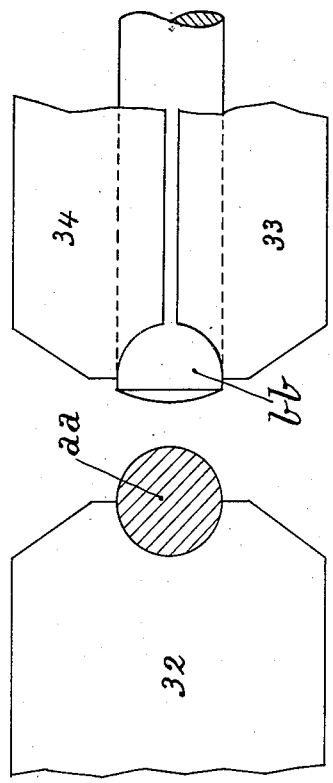
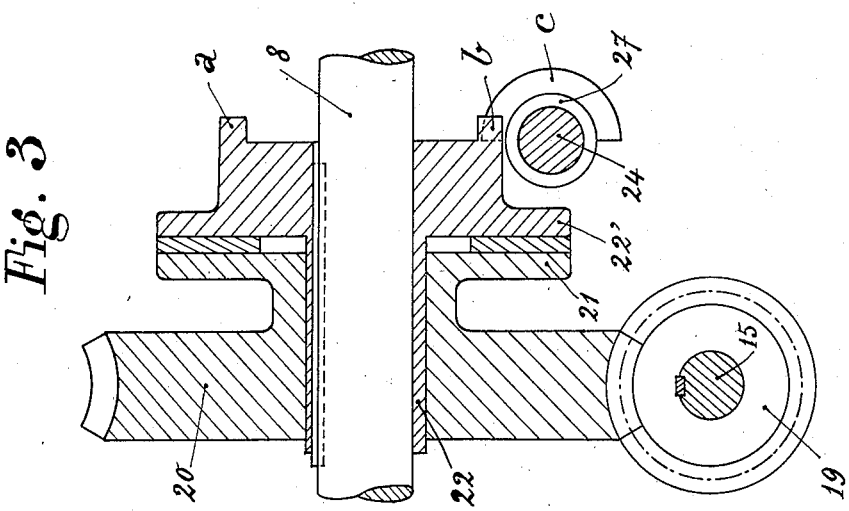
INVENTOR:
Amédée G. F. Fargues,
ATTY.

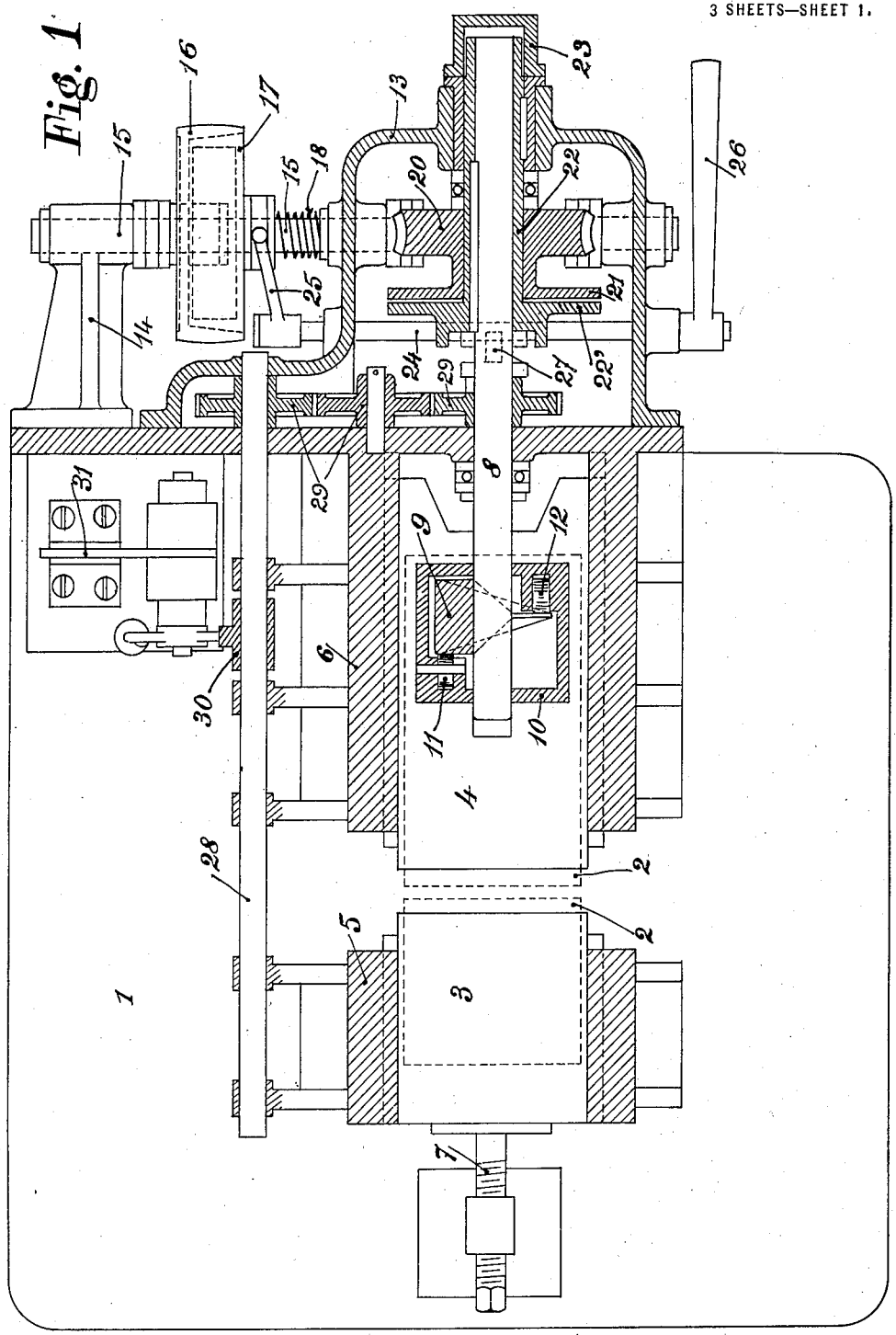

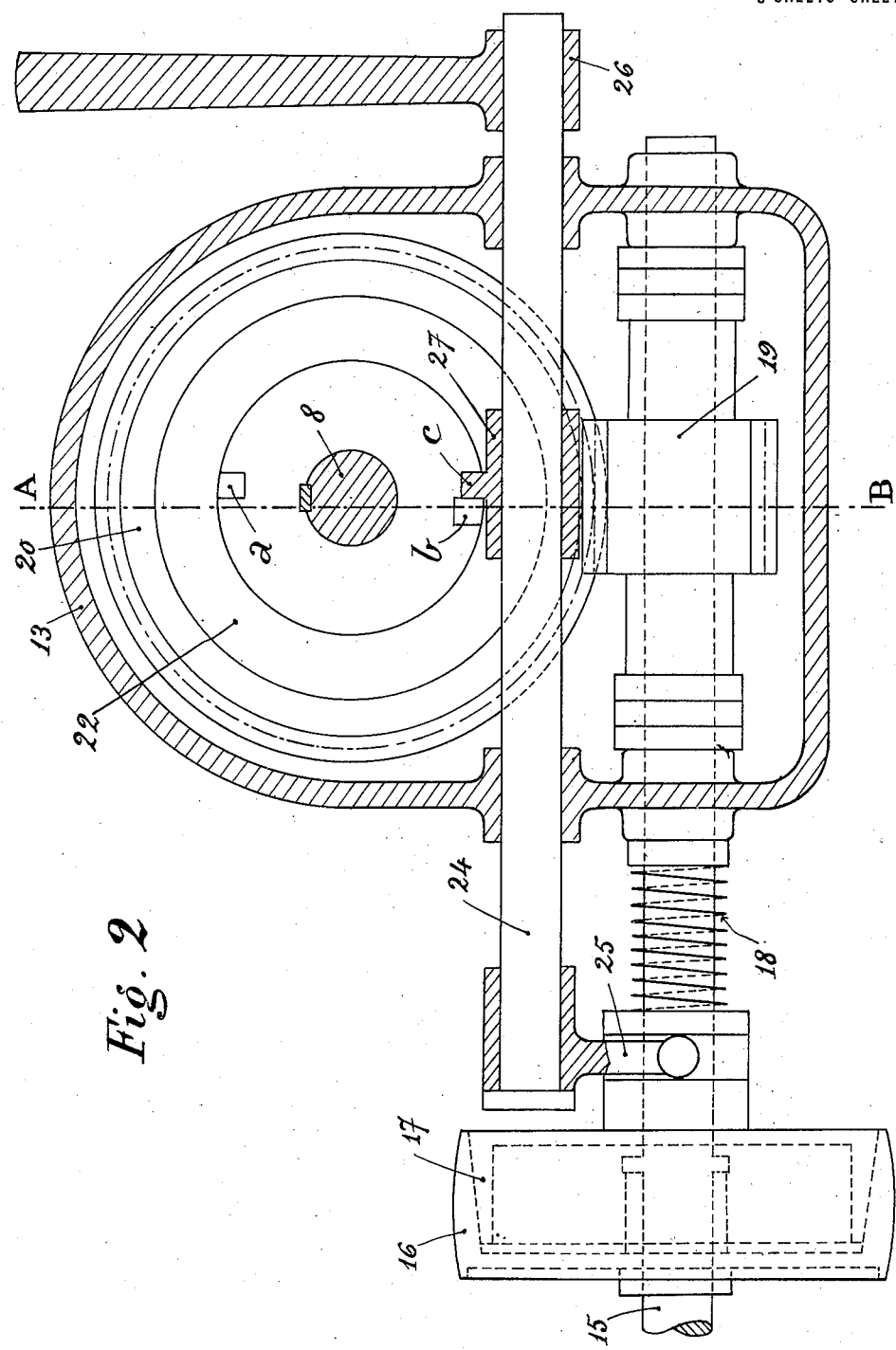

UNITED STATES PATENT OFFICE.

AMÉDÉE GEORGES FIRMIN FARGUES, OF LYON, FRANCE.

WELDING-MACHINE.

1,329,890.　　　　Specification of Letters Patent.　　Patented Feb. 3, 1920.

Application filed May 9, 1918. Serial No. 233,571.

*To all whom it may concern:*

Be it known that I, AMÉDÉE GEORGES FIRMIN FARGUES, a citizen of the French Republic, residing at Lyon, in France, have invented new and useful Improvements in Welding-Machines, of which the following is a specification.

This invention consists in a machine working more or less automatically for use in the electric welding of bars, either end to end in line or at an angle, or with the end of one bar against the body of the other in the form of a T. The machine is intended to provide for the automatic regulation of the heating of the ends of the bars up to the necessary point of softening, the stoppage of the heating at the desired point to avoid complete fusion, and firm compression of the faces of the joint in contact with one another.

Reference being made to the annexed drawings:—

Figure 1 is a plan view of the machine with certain parts omitted.

Fig. 2 is a vertical section on a larger scale approximately on the line 2—2 Fig. 1.

Fig. 3 is a section on the line 3—3 of Fig. 2.

Fig. 4 is a detail view of the gripping devices or face plates used in the welding of bars to form T joints.

In this machine the heating is produced by an alternating electric current of very low voltage, and for this purpose a step-down transformer (not shown) is fixed under the table 1 which is supported on a suitable stand (not shown) inclosing the transformer. The two poles 2 of the secondary of the said transformer are carried through the table 1 and are shown in dotted lines in Fig. 1. Two slides 3, 4 of copper or other good conductive metal have contact with the two poles 2 respectively. On the extremities of these slides are mounted the face plates or holders, also of copper, (not shown) for the bars to be welded together. These face plates or holders are in general of known form, but one form, for T welding, is shown in Fig. 4. The slides are held in place and in contact with the poles by fixed guides 5, 6 on the table 1. They may also if desired be electrically connected with the poles of the transformer by flexible conductors. 7 is a screw adjustment for the slide 3 which is held fixed during the welding. The slide 4 is given a reciprocating movement to and from the slide 3 by the rotation of the shaft 8 carrying a cam 9 engaging in a box 10 on the slide 4. The cam 9 comprises two helicoidal surfaces on the right and left side respectively and in a half cylinder. The box 10 contains two rollers 11, 12 for coöperation with these helicoidal surfaces respectively. In Fig. 1 the cam is illustrated as having pushed the box 10 and slide 4 to the left to the end of its course. In the following half revolution of the shaft the cam will operate on the roller 12 and shift the box 10 and slide 4 to the right.

The cam may have such profiles as are necessary to give the movements and resting periods, if any, needed for special work.

The shaft 8 is operated by the following means: A casing 13 and a pillar block 14 carry a shaft 15 in a plane at 90° to that containing the axis of shaft 8. 16 is a loose pulley on shaft 15 and 17 a cone clutch for engaging the pulley 16 with the shaft 15. The clutch 17 is engaged by action of the spring 18. Motion is transmitted from shaft 15 to shaft 8 by the worm 19 and worm wheel 20. The worm wheel 20 is loosely mounted on shaft 8 and carries integral with it a disk 21 adapted frictionally to engage a similar plate 22 the hub of which is keyed to shaft 8. This hub extends through a bearing in the casing 13 and is threaded to engage a nut outside the casing 13 and bearing against the latter.

By this means the frictional pressure between the disks 21 and 22 may be adjusted. The shaft 8 will therefore be rotated by friction and consequently the thrust given by the cam 9 to the slide 4 will be limited by the frictional engagement of the disks 21, 22.

Assuming that the two pieces to be welded together have been mounted in their holders or face plates and brought together and the current passing, the metal will soften, and when the friction of the disks becomes sufficient to overcome the resistance of the metal, the slide 4 will move farther and press the pieces firmly together. It is desirable that there should be a term of rest at this point to enable the operator to unfasten the holders so that the return movement of the slide 4 may not tear the welding apart. A further term of rest is desirable at the other extremity of movement to permit the operator to remove the welded pieces and insert others. These terms of rest are provided for by the following mechanism:—A rod 24 traversing the casing 13 carries a striking fork 25 for unclutching the clutch 17 and a hand lever 26. The rod 24 may be above or below the shaft 8 according to the direction of rotation of the worm wheel 21, as in Figs. 2 and 3 respectively.

At suitable points on the rotation of the shaft 8, the dog $c$ on the sleeve 27 pinned to the rod 24 will contact with the dogs $a$ $b$ and cause the rod to be shifted to disengage the clutch 17. The pulley 16 becoming loose, the rotation of the shafts 15 and 8 will stop. A hand movement of the lever 26 will disengage the dog $c$ and permit the clutch to be reëngaged by the spring 18.

The number of dogs $a$, $b$ may be increased or diminished, as required, or if the machine is to be entirely automatic the dogs aforesaid may be omitted. In the latter case the movements of feed, retirement, pressing and releasing the rods and the like may be performed by a supplementary shaft 28 driven by the train of gears 29. This shaft carries a cam 30 acting on the switch 31 of any suitable construction for opening and closing the electric circuit. The cam 30 is adjusted preferably for breaking the circuit at a point short of the full advance movement of the slide 4, this distance varying with the section of the weld.

The machine operates as follows:—For end to end welds in a straight line or at an angle, the bars to be welded are held in appropriately shaped holders and brought together by the movement of the slide 4, the current is automatically switched on and the plates 21, 22 slip until the ends have been softened sufficiently to diminish their resistance to the continued movement of the slide 4. The movement of the latter then automatically continues, the current is cut off and the ends pressed firmly together.

For end-to-side, or T welds, it is necessary to overcome the difficulty that the end or rod heats more readily than the side or bar. For this reason it has been heretofore the practice to employ two transformers, the bar being heated between the poles of the one transformer and the rod between the poles of the other. Current is first sent through the first of these to heat the bar, then cut off from that and sent through the second to heat the rod while the bar is put in contact with the free pole of the second. The weld will then take place as in the end-to-end example.

The apparatus shown in Fig. 4, however, permits of these welds being made directly and without previous heating or waste of time.

In the apparatus illustrated in Fig. 4, the bar $a$ $a$ is held by a holder 32 of copper or other good conductor shaped to engage one side of the bar for about half its circumference, while the rod $b$ $b$ is held between two holders 33, 34 suitably shaped to engage respectively nearly half the circumference of the rod and shaped at their ends to pass about the free portion of the bar $a$ $a$. In action the molten metal squeezed from the end of the rod $b$ $b$ will flow laterally and prevent the holders 33, 34 from contacting with the bar $a$ $a$.

The nut 23 enables the friction between the disks 21, 22 to be regulated according to the shape and sectional area of the pieces to be welded. The frictional drive remains practically constant so that a series of similar welds will be similarly effected. The pressure being continuous the welds are solid and without blow holes or cracks. The electric conductor should be carefully insulated and it may be desirable to cause water to circulate over the slides and holders, and, if needed, over the transformer to preserve a normal temperature in the conductors.

Although the machine illustrated is horizontal, it will be understood that it may be vertical or inclined if the nature of the work renders this desirable.

What I claim as my invention and desire to secure by Letters Patent of the United States is:—

1. In electric welding machines, means for approaching the parts to be welded to one another comprising a frictional drive.

2. In electric welding machines, means for approaching the parts to be welded to one another comprising a frictional drive and means for regulating the frictional resistance of such drive to slip.

3. In electric welding machines, means for approaching the parts to be welded to one another comprising a frictional drive, means for constant rotation applied to said frictional drive, and a clutch for disengaging said constant rotation means.

4. In an electric welding machine means for holding the parts to be welded, means for giving reciprocatory movement to one of said holding means, said last mentioned means comprising a frictional drive.

5. In an electric welding machine means for holding the parts to be welded, means for giving reciprocatory movement to one of said holding means, said last mentioned means comprising frictional drive, means for constant rotation applied to said frictional drive, and a clutch for disengaging said constant rotation means.

6. In an electric welding machine means for holding the parts to be welded, means for causing said holding means to approach one another, a source of electric energy for the welding operation, and means operated by the approach movement for breaking the electric circuit.

7. In an electric welding machine means for holding the parts to be welded, means for causing said holding means to approach one another, a source of electric energy for the welding operation, and means operated by the approach movement for breaking the electric circuit and adapted on the receding movement to reëstablish the electric circuit.

In testimony whereof I have signed my name to this specification in the presence of two subscribing witnesses.

AMÉDÉE GEORGES FIRMIN FARGUES.

Witnesses:
GASTON JEANNIAUX,
L. ERCHER.